United States Patent [19]

Chevion et al.

[11] Patent Number: 4,884,131
[45] Date of Patent: Nov. 28, 1989

[54] STEREOSCOPIC TELEVISION SYSTEM WITH PREDICTIVE CODING TO MINIMIZE DATA BANDWIDTH

[75] Inventors: Dan S. Chevion, Haifa; Ehud D. Karnin; Eugeniusz Walach, both of Kiryat Motzkin, all of Israel

[73] Assignee: International Business Machines Corp., Armonk, N.Y.

[21] Appl. No.: 231,934

[22] Filed: Aug. 15, 1988

[30] Foreign Application Priority Data

Sep. 2, 1987 [IL] Israel .................................. 83752

[51] Int. Cl.⁴ ............................................ H04N 13/00
[52] U.S. Cl. ........................................ 358/88; 358/92; 358/91; 358/138
[58] Field of Search ...................... 358/88, 89, 91, 92, 358/136, 135, 138

[56] References Cited

U.S. PATENT DOCUMENTS

4,704,627  11/1987  Yuyama et al. .................. 358/92 X
4,743,965  5/1988  Yamada et al. ................. 358/135 X Primary Examiner—James J. Groody
Assistant Examiner—Victor R. Kostak
Attorney, Agent, or Firm—Joscelyn G. Cockburn

[57] ABSTRACT

A method and apparatus for transmitting and receiving 3-dimensional video images of a scene using conventional video transmission channels. The method requires the production of two images of the scene obtained from slightly different viewing angles, the images being sampled so as to generate for each image sets of component picture elements which are then sub-sampled according to a predetermined pattern, so as to form first and second sets of signals for each image. Both sets of signals corresponding to one of the images are transmitted to enable a conventional receiver to display a 2-dimensional image. A second set of signals for the other image is predicted both at the transmitter and at a modified receiver, enabling a correction signal corresponding to the difference between the predicted and actual signals to be transmitted to the modified receiver which regenerates the actual signals and displays them together with the corresponding first set of signals of the first image.

17 Claims, 5 Drawing Sheets

STEREOSCOPIC TELEVISION SYSTEM WITH PREDICTIVE CODING TO MINIMIZE DATA BANDWIDTH

This invention relates to a method and apparatus for transmitting and receiving 3-dimensional video images. In particular, it relates to a method for transmitting such images using conventional television channels and in such a way that a conventional receiver is able to interpret the transmitted video date as a conventional 2-dimensional image, and that a modified receiver is enabled to interpret the transmitted video data as a 3-dimensional image.

It is known to view a scene from two different angles and then to ensure that each eye of the viewer will see only its corresponding image, in order to create the impression of 3-dimensional display. Various systems have been proposed in the prior art wherein the display monitor is constructed in such a manner that different component images will be respectively viewed by a pair of eyes. U.S. Pat. No. 4,236,172 (Krasnoperov), for example, describes a system wherein each viewing angle corresponds to a different color. A television picture is produced by separating the green component for one eye of the viewer and the red and blue components for the other eye. The viewer must then wear glasses with corresponding filters for each eye so that the 3-dimensional effect can be created. However, this approach causes a severe distortion to the coloring of the composite image, and thus it is inadequate for color television. Moreover, the transmission of both components signals of the stereo pair is through individual communication channels, rendering the system costly.

In U.S. Pat. No. 4,424,529 (Roese) the component images generated from each viewing angle are displayed at a different time. The transmission of each of the time-separated images to the respective eyes of the viewer is synchronized such that each eye receives only its corresponding image. In order to achieve this, the viewer must wear a special pair of glasses which are provided with electro-optic shutter means which operate in accordance with a suitable synchronizing signal. However, such glasses are complex, fragile and inconvenient for the viewer. Moreover, since each eye sees its corresponding image for only half of the total transmission time, the raster scan frequency and, consequently, the frequency of transmission must be doubled in order to eliminate the effect of flicker. The bandwidth of the display is thus increased and such a system is incompatible with existing television receivers.

An alternative approach to the use of electro-optic shutters, is to polarize the images obtained from each viewing angle so that two consecutive images have a 90° polarization shift. The viewer's glasses then consist of a simple pair of 90° shifted polarization lenses and are very much simpler and more convenient than the glasses described in Roese. However, such a system requires a sophisticated polarizing display capable of switching its polarity 60 or 120 times/sec. It is, therefore, impossible to utilize existing television receivers. Moreover, the bandwidth of the display must be increased in order to avoid flicker, as explained above.

An overall problem inherent in all such hither to proposed systems, is that it is impossible to receive a 2-dimensional image with a conventional television receiver. Thus, if 3-dimensional images were transmitted according to any of the hitherto proposed systems, no existing 2-dimensional television receivers could be used. This is unacceptable since a workable system must provide the facility to use both conventional and modified television receivers.

SUMMARY OF THE INVENTION

It is an object of the present invention to provide a method and apparatus for transmitting and receiving 3-dimensional video images which reduce or overcome many of the disadvantages associated with hitherto proposed systems.

According to a broad aspect of the invention, there is provided: a method for transmitting at a transmitter site and receiving at a receiver site 3-dimensional video images of a scene using conventional video transmission channels, comprising:

producing at least two images by imaging said scene from different viewing angles, sampling said images so as to generate sets of component picture elements respectively associated with each image, storing all said sets of component picture elements and sub-sampling said sets of component picture elements in accordance with a predetermined pattern order to form first and second sets of signals for each set of component picture elements, storing all said sets of signals, transmitting both sets of signals of a first of said images, predicting a second set of signals of a second of said images at both the transmitter and receiver sites, generating at the transmitter site a compressed set of signals derived from said sub-sampled second set of signals of said second image and said corresponding predicted set, transmitting said compressed set of signals, and receiving and processing at said receiver site all the transmitted signals so as to regenerate said second set of signals.

Thus, the present invention provides a method for transmitting and receiving 3-dimensional video images and which can be used with existing equipment. Thus, in a preferred embodiment, two television cameras are so arranged as to generate slightly different component images corresponding, as nearly as possible, to the different images which would be received by the two eyes of an observer looking at the same scene. The signals corresponding to one of the component images are transmitted in a normal manner in order to be capable of generating a conventional 2-dimensional picture on a conventional receiver. A compressed set of signals corresponding to the other component image is also transmitted and this has no effect on a conventional receiver in an analogous manner to the way that the color information content of a color broadcast has no effect on a monochrome receiver. However, in a receiver designed to recreate the effect of a 3-dimensional picture, processing means are included which combine some of the picture elements of the first component image with complementary picture elements from the second component image so as to generate a stereo image on the screen of the modified receiver.

In order to perceive the stereo image in three dimensions, means are provided for presenting the picture elements corresponding to the first camera image to the first eye of a viewer and the picture elements corresponding to the other camera image to the other eye of the viewer. This is achieved by polarizing the screen of the receiver so that the picture elements of the first component image are polarized in a plane substantially orthogonal to that of the picture elements of the second component image. The viewer is then provided with glasses fitted with corresponding polarizing elements so that, for example, the left eye will see only those picture elements of the first component image and the right eye will see only those picture elements of the second component image. Since these two component images correspond to the original camera images, the two eyes of the viewer will see slightly different images which will be interpreted as a lower resolution 3-dimensional perspective view of the original scene.

BRIEF DESCRIPTION OF THE DRAWINGS

The invention will now be described with regard to a system for transmitting and receiving television broadcasts of 3-dimensional images with reference to the accompanying drawings, in which.

DESCRIPTION OF PREFERRED EMBODIMENT

Figure 1:
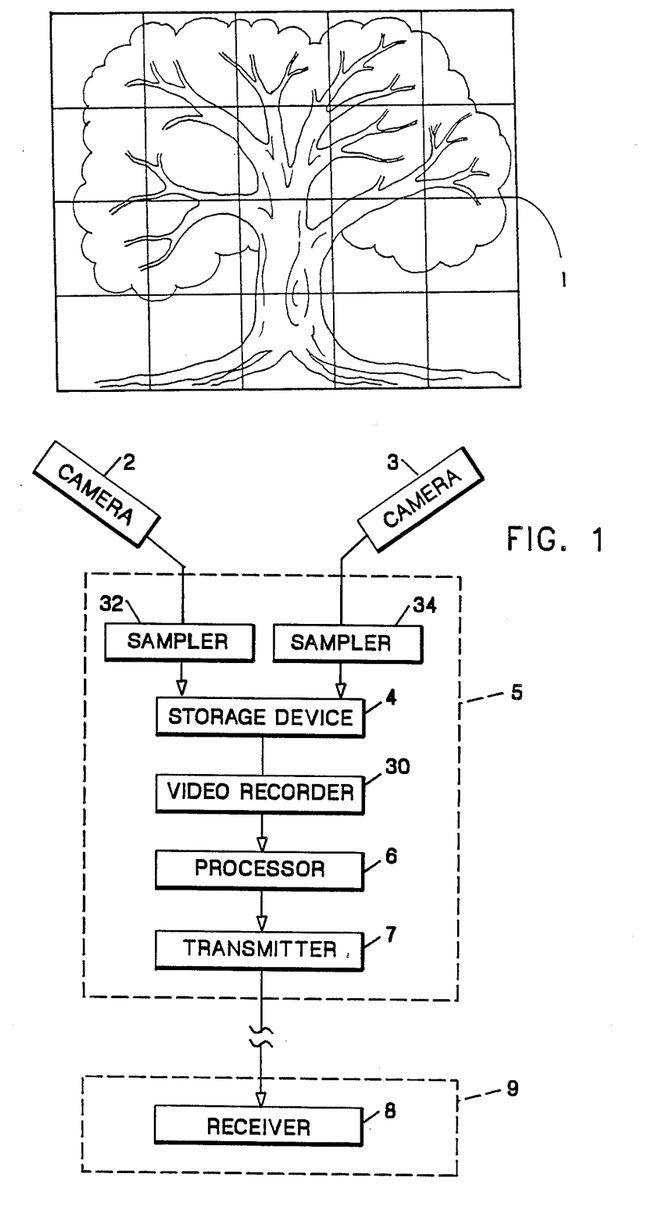
FIG. 1 is a block diagram showing the main functions of the system according to the invention.

Referring to FIG. 1 there is shown a simplified block diagram indicating the main functional elements in a transmission and reception system for transmitting and receiving 3-dimensional video images according to the invention. There is shown a scene 1 which is viewed by two cameras 2 and 3 displaced a short distance from each other so as to image the scene from slightly different viewing angles.

Superimposed on the scene 1 is an imaginary grid which is intended to represent schematically the picture element of the imaged scene. Thus, for the purpose of simplified explanation, it will be assumed that each camera creates twenty picture elements. These picture elements constitute component images which are sampled by sampling devices 32 and 34 and stored in a storage device 4 located at a transmitter site 5 for subsequent processing within a processor 6 also located at the transmitter site 5. The processed signals are then transmitted by a transmitter 7 to a receiver 8 located at a receiver site 9. The video recorder 30 generates a video recording of the data stored in a storage device 4.

The picture elements associated with the scene 1 are slightly different for each of the two cameras 2 and 3 on account of the different viewing angles of the cameras. One function of the processor 6 is using subsampling means 36 to sub-sample the picture elements associated with camera 2 and a complementary set of picture elements associated with camera 3. The picture elements shown in FIG. 1 may be notionally represented as alternate black and white squares of a checkerboard pattern (constituting a predetermined pattern). A conventional 2-dimensional television receiver produces a picture constituted by "black" and "white" picture elements derived from a single image of a scene viewed by one television camera. The method of transmission according to the invention, however, is such that the picture produced by a television receiver which has been modified (as explained below) is constituted by "white" picture elements derived from the first camera 2 and by "black" picture elements derived from the second camera 3.

Figure 2:
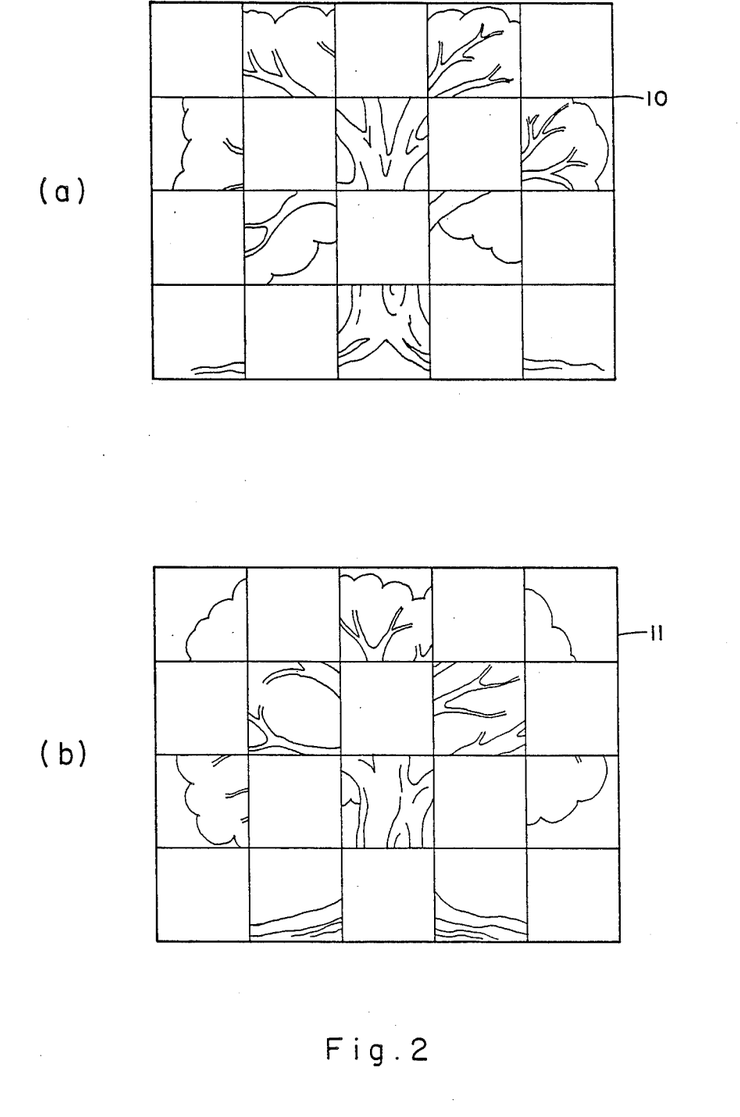
FIGS. 2a and 2b are pictorial representations of a sub-sampled set of picture elements in FIG. 1 transmitted to a stereo television screen.

FIG. 2 shows two component images 10 and 11 displayed on a modified television receiver, wherein component image 10 corresponds to the sub-samples "white" picture element of the first camera 2 and the component image 11 corresponds to the sub-sampled "black" picture elements of the second camera 3.

A composite image will correspond to the simultaneous display of the two component images 10 and 11 on a modified television receiver and will be similar, but not identical, to the original scene 1. The differences are due to the fact that the two component images 10 and 11 are derived from different viewing angles. Thus, if the component images 10 and 11 are viewed respectively by the left and right eyes of a viewer, the viewer will effectively see an image of the original scene with a slight perspective shift which will enable the received image to be interpreted as a stereoscopic 3-dimensional view.

The present invention permits conventional communications channels to be employed for transmitting and receiving 3-dimensional video images. Moreover, the method of data transmission according to the invention is compatible with existing 2-dimensional television receivers.

In order to achieve this, all the picture elements associated with the first camera 2 are transmitted. A conventional television receiver will receive this data in the normal manner to produce a 2-dimensional picture in order to produces a 3-dimensional picture, a modified receiver must be adapted to process the transmitted data so as to display only the "white" picture elements associated with the first camera 2 together with the "black" picture elements associated with the second camera 3. However, in order to transmit all the data corresponding to the "black" picture elements of the second camera 3 in their entirety, the total quantity of data to be transmitted would be increased by 50% and the bandwidth of the communications channel would need to be increased accordingly. The transmission system in accordance with the invention and as described in detail below obviates this requirement.

Figure 3:
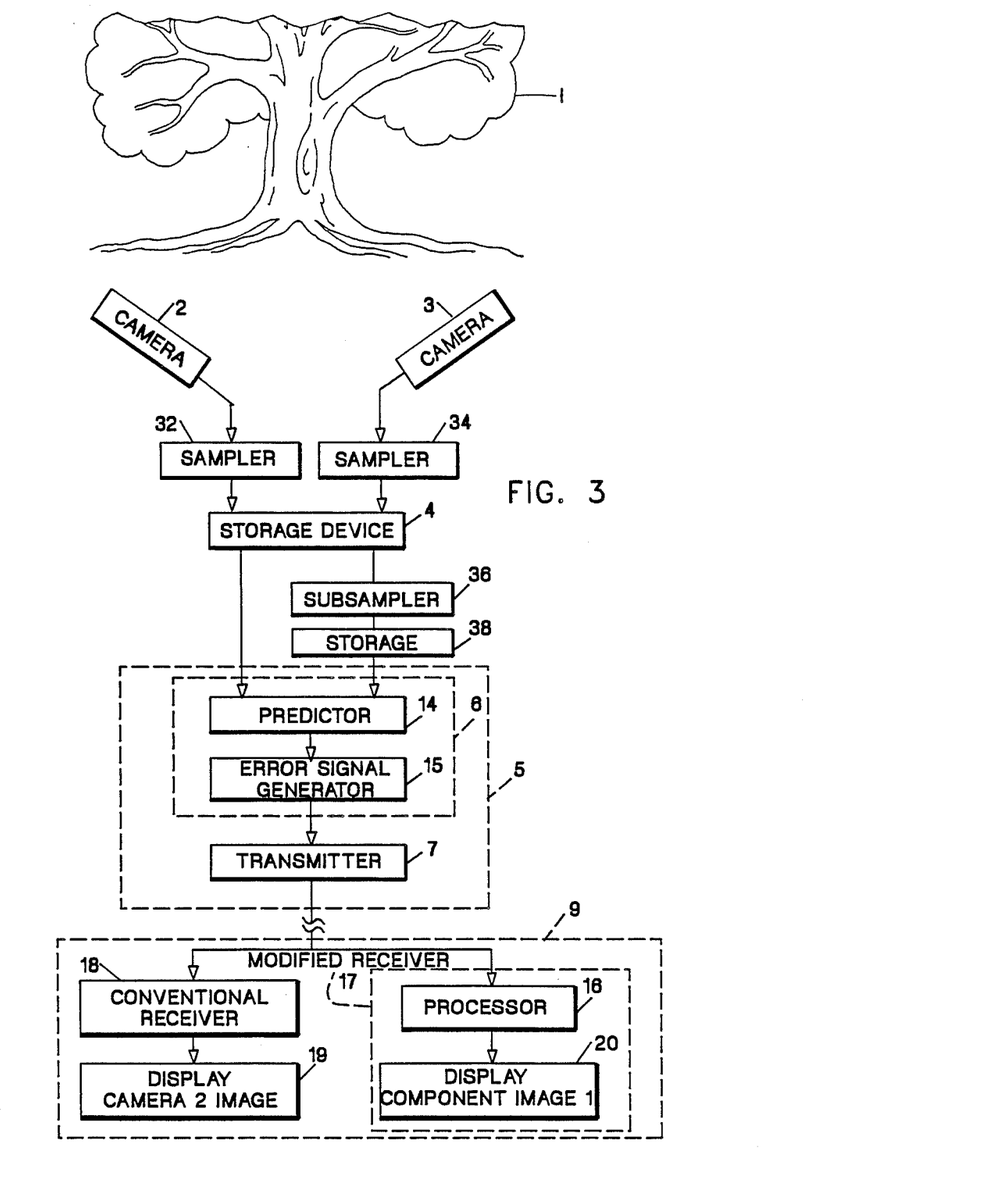
FIG. 3 is a block diagram showing in greater detail the functional elements of the system shown in FIG. 1.

FIG. 3 shows a more detailed block diagram of the functional elements in the transmission and reception system. The signals representative of component images which are generated by cameras 2 and 3 are sampled by samplers 32 and 34, respectively. The signals which are associated with camera 3 are subsampled by subsampler 36 and stored in storage 38.

As will be seen by reference to FIG. 3, the processor 6 at the transmitter site 5 comprises a predictor 14 and an error signal generator 15 whose combined function is to compress the data associated with the component image 11 (see FIG. 2) corresponding to the "black" picture elements of the second camera 3. By the phrase "data compression" is meant the technique whereby the quantity of data which is transmitted is smaller than that constituting the complete information to be transmitted but nevertheless is sufficient to enable the complete information to be reconstructed. Data compression relies on the fact that not all data constituting the information to be communicated need be transmitted in order for the complete information to be reconstructed.

The information to be transmitted generally contains some "redundant" data, i.e. data which need not be transmitted without derogating from the completeness of the reconstructed information. The quantity of redundant data is greater when there is good statistical correlation between the elements constituting the data.

On account of the proximity of the two cameras 2 and 3, the two camera images according to the present invention are very similar and there thus arises a high correlation between the picture elements associated with the two images. The present invention exploits this correlation so as to permit the "black" picture elements of the second camera 3 to be reconstructed at the receiver site 9 whilst only transmitting a minimal amount of data in excess of a 2-dimensional broadcast. In fact, by virtue of the correlation between the two camera images, it is possible to reconstruct the "black" picture elements of the second camera 3 from a knowledge of the "black" and "white" picture elements of the first camera 2 and compensating for the small difference between the two images. In other words, much of the data corresponding to the "black" picture elements of the second camera 3 is redundant and can be omitted from the transmission so as to compress the amount of data actually transmitted.

The preferred method of compressing the image data associated with the second camera 3 is to use a "predictor" algorithm wherein only relatively sparse data associated with the second camera 3 need be transmitted in order to regenerate the "black" picture elements, corresponding to the image data generated by the second camera 3, at a modified TV receiver 17. The predictor algorithm relies on the fact that all sub-sampled sets of data associated with the first camera 2 are transmitted and therefore available for preprocessing at the TV receiver. Thus, the "white" and "black" picture elements associated with the image data of the first camera 2 are available for processing at the modified receiver 17. In a conventional receiver 18 there will be no preprocessing of image data, and these "white" and "black" picture elements will be used directly in order to display a conventional 2-dimensional image 19.

As can be seen in FIG. 3 the modified receiver comprises a processor 16 which receives and stores information relating to the "black" and "white" picture elements associated with the first camera 2 and extracts therefrom the "white" picture elements of the first camera 2 in order to send the image data (comprising colour and brightness information) to corresponding picture elements of the TV screen. The processor 16 (FIG. 3A) comprises a storage 26, a second predictor 27 and a prediction error correction device 28 whose combined function is to recreate the actual values of image data corresponding to the black picture elements of the second camera 3. For all except the initial frame, the image data associated with the "black" and "white" picture elements of the first camera 2 as well as the corresponding "black" picture elements of the second camera 3 as derived from the previous picture frame, are used by the predictor algorithm in order to predict subsequent values for the image data corresponding to the "black" picture elements of the second camera 3.

Figure 3A:
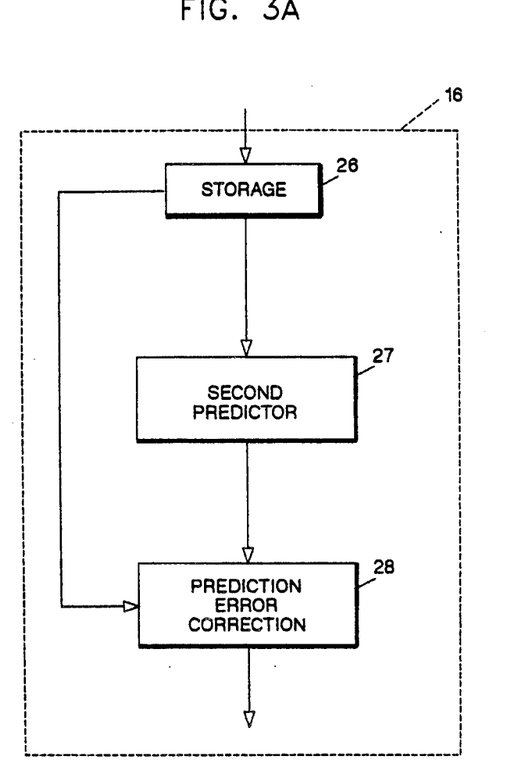
FIG. 3A is a block diagram showing functional elements of the processor 16.

Having predicted the current value for the image data corresponding to the "black" picture elements of the second camera 3, this value is then corrected (as explained below in greater detail) so that what is actually stored within the processor 16 are the actual values of the image data corresponding to the "black" picture elements of the second camera 3. It is from the actual values of the picture elements of the current frame of the first camera 2 together with the "black" picture elements of the previous frame of the second camera 3, that the "black" picture elements of the current frame of the second camera 3 are predicted. Thus, if A represents the total picture element data associated with the first camera 2, and $B_b$ represents the "black" picture element data associated with the second camera 3, then $$B_{b(current)} = G\{A, B_{b(previous)}\}$$

where $G\{A, B_{b(previous)}\}$ represents a geometrical transformation of the prior knowledge of the image data corresponding to the "black" and "white" picture elements of the first camera 2 together with the prior knowledge of the image data corresponding to the "black" picture elements of the second camera 3. This technique is known as "difference predictive coding". (For further details on "predictive coding" see:

J. B. O'Neal, Jr., "Predictive Quantizing", Bell Syst. Techn. Journal 45 (1966) pp. 689-722, G. Zarone, "Classification and Block Coding of the Frame Difference Signal", in T. S. Huang (Ed.) "Image Sequence Processing and Dynamic Scene Analysis", NATO ASI Series, Vol. F2, Springer 1983, pp. 337 ff, W. F. Schreiber, "Fundamentals of Electronic Imaging Systems", Springer 1986, pp. 125 ff).

The essential feature of this method of coding as applied to the invention is that from previously stored image data corresponding to all the picture elements of the first camera 2 and the "black" picture elements of the second camera 3, a current value for "black" image data of the second camera 3 may be predicted.

The prediction of the "black" picture elements of the current frame of the second camera 3 as described above requires that the current frame of the first camera 2 as well as the "black" picture elements of both the previous and current frames of the second camera 3 be stored within the processor 16. For the first frame of data there is no previous frame of "black" picture elements from which to predict the current "black" picture elements of the second camera 3. Therefore, the method of predicting the "black" picture elements of the first frame of the second camera 3 must either be based on the "black" and "white" picture elements of the first frame of the first camera 2; or, alternatively, the data corresponding to the "black" picture elements of the first frame of the second camera 3 may simply be transmitted without any attempt at prediction.

The prediction of the "black" picture elements of the second camera 3 as described above is performed at both the transmitter site by the predictor 14 and at the receiver site by the processor 16. However, the actual value of the predicted image data stored within the processor 6 at the transmitter site 5 is known, and an error signal may therefore be derived wherein:

$B_b$ represents the "black" image data of camera 3 at the transmitter, and $B_b'$ represents the current value of the "black" image data at the receiver as predicted by the predictor algorithm, and E represents the error between the actual and predicted values of $B_b$ then $$E = B_b - B_b'$$

It is, therefore, necessary to transmit only the error data as represented by E in the above equation. Where the value of $B_b'$, as predicted by the processors 6, 16 in the transmitter and receiver, respectively, corresponds exactly to the actual value of $B_b$ generated at the transmitter, the error signal, E, will be zero and no data is transmitted. In the context of data compression, the "entropy" of a signal is the minimum amount of data which need be transmitted in order to be able to reconstruct the original signal without loss of information. As compared with the entropy of the signal $B_b$, the entropy of the error signal, E, is very low and may therefore be transmitted by a low-entropy correction factor. In other words, the error signal, E, is not itself transmitted but rather a further compressed correction factor which enables the error signal to be reconstructed by the processor 16 in the modified receiver 17. This is then combined with the signal $B_b'$ predicted by the receiver processor 17 in order to reconstruct the actual signal $B_b$.

Using such a system, a highly compressed data format corresponding to the "black" picture elements of the image data corresponding to the second camera 3 may be transmitted while still permitting the "white" and "black" picture elements of the modified receiver 17 to be correctly illuminated. It will be understood that the compressed data may be transmitted within conventional channels by utilizing the unused space which is a feature of conventional broadcast channels.

Figure 4:
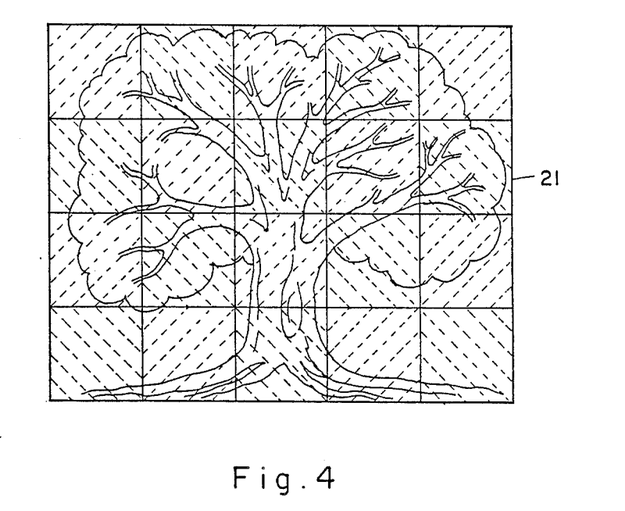
FIG. 4 shows a method of polarizing the light corresponding to the picture elements shown in FIG. 3.

FIG. 4 shows a method of polarizing the picture elements of a modified TV screen 21 so that all the "white" picture elements will be polarized in a plane orthogonal to that of the "black" picture elements, where the terms "white" and "black" are as defined with reference to FIG. 2. Each square in FIG. 4 represents one picture element as described with reference to FIGS. 1 and 2. The direction of the shading of each square indicates the plane of polarization of the corresponding picture element. The exact orientation of the two planes of polarization is not critical as long as they are mutually perpendicular However, in a preferred embodiment, each plane of polarization is oriented at an angle of 45° to the vertical.

Preferably, the picture elements of the television screen are polarized during the manufacture of the screen by mounting a suitable polarizing screen directly over the television tube so as to be exactly aligned with the picture elements. The proximity of the polarizing screen to the television tube eliminates parallax problems and improves the resultant quality of the 3-dimensional television picture.

However, it is possible to mount a separate polarizing screen in front of a conventional television screen in order to polarize the picture elements as required although, owing to inevitable parallax errors, the resultant picture quality will be somewhat impaired.

Figure 5:
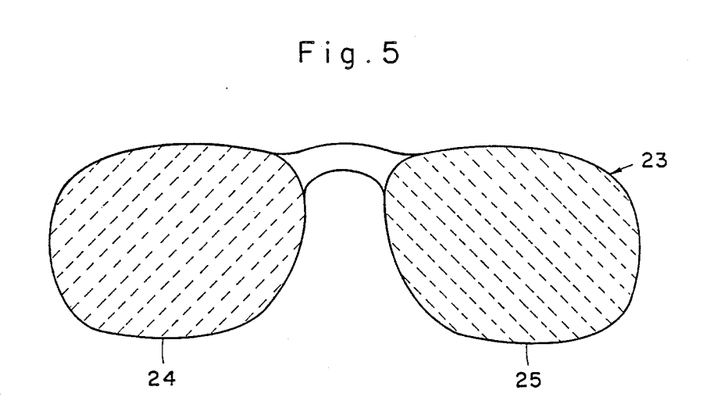
FIG. 5 shows a pair of glasses with polarizing elements suitable for viewing the modified television screen shown in FIG. 4.

FIG. 5 shows a pair of glasses 23 to be worn by a viewer in which the two eye pieces contain polarizing elements 24, 25 whose planes of polarization correspond exactly to those of the "white" and "black" picture elements shown in FIG. 4. Thus, a viewer wearing such glasses will view the "white" picture elements with his left eye and the "black" picture elements with his right eye. However, since the "white" picture elements correspond to the image data of the first camera 2 only and the "black" picture elements correspond to the image data of the second camera 3 only, the viewer will see an image corresponding to the first camera 2 with his left eye and an image corresponding to the second camera 3 with his right eye. The displacement of the cameras 2 and 3 is such that the different images they perceive of a scene correspond, as near as possible, to the images which would be viewed by an observer standing at the camera site. Thus, by presenting to alternate eyes of the television viewer the image data of each camera, the viewer is able to reconstruct the effect of 3-dimensional vision.

The invention has been described with reference to a checkerboard type pattern being used as the predetermined image data sampling pattern. However, the actual pattern is not a critical feature of the invention and any other convenient pattern may be employed. For example, the two camera images may be displayed on alternate columns or rows of a television receiver.

Although the preferred embodiment has been described with reference to two cameras, it will be understood that one camera with two lenses may also be used in order to generate two stereoscopic images. Furthermore, it is also possible to employ more than two cameras in an arrangement wherein the additional image data thus obtained enables the second set of subsampled picture elements of the second image to be compressed even further. This follows since the data corresponding to the third image is necessarily redundant (if it were not, two images would be insufficient to generate a 3-dimensional image) and the greater the quantity of redundant data the lower is the entropy of the data, thereby permitting greater compression.

The above description relates to a method for broadcasting and receiving television pictures and, in particular, a method of processing received image data so as to reconstruct the correct components of the subsampled image data of cameras 2 and 3. It will be understood, that once this processed image data has been generated it can be stored on a suitable magnetic medium such as, for example, video tape, and may subsequently be reproduced in a receiver which is not provided with the processing means as described above. It is then only necessary to polarize alternate picture elements of the television screen in the manner described in order to observe a 3-dimensional image on the television receiver.

Thus, using the technique described, image data derived from two cameras may be transmitted along a single communications channel in a compressed manner so as to be reconstructed at a suitably modified receiver and thereby give the appearance of a 3-dimensional image. Moreover, since both eyes see their respective images simultaneously, neither the raster scan frequency of the receiver nor the bandwidth of the communications channel is increased.

We claim:

1. A method for transmitting at a transmitter site and receiving at a receiver site 3-dimensional video images of a scene using conventional video transmission channels, comprising:
   producing at least two images by imaging said scene from different viewing angles,
   sampling said images so as to generate sets of component picture elements respectively associated with each image,
   storing all said sets of component picture elements and sub-sampling said sets of component picture elements in accordance with a predetermined pattern in order to form first and second sets of signals for each set of component picture elements, storing all said sets of signals, transmitting both sets of signals of a first of said images, predicting a second set of signals of a second of said images at both the transmitter and receiver sites, generating at the transmitter site a compressed set of signals derived from said sub-sampled second set of signals of said second image and said corresponding predicted set, transmitting said compressed set of signals, and receiving and processing at said receiver site all the transmitted signals so as to regenerate said second set of signals.

2. A method according to claim 1 wherein said component picture elements are sub-sampled 2:1 such that all the picture elements associated with the first image (A) will be split into two equal sets ($A_1$ and $A_2$) and all the picture elements associated with the second image (B) will be split into two equal sets ($B_1$ and $B_2$).

3. A method according to claim 2 wherein said sets $A_1$ and $B_1$ correspond to the picture elements an odd diagonals of the image and said sets $A_2$ and $B_2$ correspond to the picture elements on even diagonals of the image.

4. A method according to claim 2 wherein said sets $A_1$ and $B_1$ correspond to the picture elements on odd columns of the image and said sets $A_2$ and $B_2$ correspond to the picture elements on even columns of the image.

5. A method according to any one of the preceding claims wherein said predicted second set of sub-sampled signals of said second image is derived in accordance with a difference predictive coding algorithm.

6. A method according to claim 5 wherein said algorithm employs a geometrical transformation derived from said sub-sampled sets of signals of said first image and said sub-sampled second set of signals of said second image together with a low-entropy correction factor from which said sub-sampled second set of signals of said second image may be reconstructed at the receiver site.

7. A method according to claim 1 for displaying said 3-dimensional video images on the screen of a television receiver, which screen is adapted to polarize said first and second sets of component picture elements at mutually orthogonal planes, comprising:

displaying the sub-sampled first set of component picture elements associated with said first image together with the sub-sampled second set of component picture elements associated with said second image.

8. A method according to claim 7 wherein said first and second sub-sampled sets of picture elements are displayed substantially simultaneously so as to enable the resultant television picture to be raster scanned at the same scan frequently used in conventional 2-dimensional receivers.

9. A method according to claim 1 wherein the signals corresponding to said first and second sub-sampled sets of picture elements are recorded on a video recorder.

10. A method according to claim 9 further comprising polarizing alternate picture elements in mutually orthogonal planes at the receiver.

11. A method for transmitting and receiving 3-dimensional video image of a scene comprising:

(a) producing at least two images by imaging said scene from different viewing angles;

(b) sampling said images so as to generate first and second sets of component picture elements respectively associated with each image;

(c) transmitting both sets of signals of a first of said images;

(d) predicting a second set of signals of a second of said images at both a transmitter and a receiver site;

(e) generating at the transmitter site a compressed set of signals derived from one set of component picture elements of a second of said images and a corresponding predicted set;

(f) transmitting said compressed set of signals; and (g) receiving and processing at said receiver site all transmitted signals so as to regenerate said second set of signals.

12. A method for generating and displaying 3-dimensional images of a scene on the screen of a television receiver comprising:

producing two images by imaging said scene from different viewing angles sampling said images to generate sets of component picture elements respectively associated with each image;

sub-sampling said sets of component picture elements in accordance with a predetermined pattern in order to form first and second sets of signals for each set of component picture elements;

transmitting both sets of signals of a first of said images;

predicting a second set of signals of a second of said images at both a transmitter site and a receiver site;

generating at the transmitter site a compressed set of signals derived from said sub-sampled second set of signals of said second image and said corresponding predicted set;

transmitting said compressed set of signals;

receiving all transmitted signals at the receiver site;

processing and generating composite signals representative of component picture elements of the scene; and displayiing said component picture elements on a screen with "white" and "black" picture elements being displayed on mutually perpendicular planes.

13. An apparatus for transmitting and receiving 3-dimensional video images of a scene comprising:

(a) means at a transmitting site for producing two images by imaging said scene from different viewing angles;

(b) means for sampling said images to generate signals representative of first and second sets of component picture elements respectively for each one of said images;

(c) means for predicting a second set of signals representative of a second set of component picture elements for a second one of said images at both the transmitting site and the receiving site;

(d) means, at the transmitting site, for generating a compressed set of signals derived from the second set of signals and a corresponding predicted set;

(e) means for transmitting a first set of signals representative of first and second sets of component picture elements for a first one of said images and the compressed set; and (f) means at said receiver site for receiving and processing all transmitted signals so as to generate said second set of signals.

14. An apparatus for carrying out a method for transmitting and receiving 3-dimensional video images of a scene using conventional video transmission channels, comprising:

at least two camera lenses positioned at different viewing angles with respect to said scene so as to generate respective images of said scene,     sampling means for sampling said images so as to generate sets of component picture elements respectively associated with each image,     first storage means for storing said sets of component picture elements,     sub-sampling means for sub-sampling said sets of component picture elements according to a predetermined pattern so as to generate first and second sets of signals for each set of component picture elements,     second storage means for storing all said sets of signals,     transmitting means for transmitting both sets of signals of a first of said images,     first predicting means at said transmitter site for predicting a second set of signals of a second of said images,     first generating means at said transmitter site for generating a compressed set of signals derived from said sub-sampled second set of signals of said second image and said corresponding predicted set, said transmitting means transmitting said compressed set of signals, and receiving means at said receiver site for receiving and processing all the transmitted signals so as to regenerate said second set of signals.

15. A television receiver for use with an apparatus according to claim 14, comprising:

second predicting means for predicting a second set of signals of said second image,     processing means for regenerating said second sub-sampled set of component picture elements associated with said second image and displaying said first sub-sampled set of component picture elements associated with said first image together with said second sub-sampled set of component picture elements associated with said second image on the screen of the television receiver, and     polarizing means adapted to polarize alternate picture elements of said television screen in mutually orthogonal planes.

16. The apparatus set forth in claim 12 wherein the receiving means includes a television receiver responsive to the second set of signals to display the 3-dimensional video images of said scene.

17. A television receiver according to claim 15 wherein said polarizing means is constituted by a polarizing screen fitted in front of the television screen and adapted to polarize alternate picture elements of said television screen in mutually orthogonal planes.

* * * * *